United States Patent [19]

Lavely

[11] Patent Number: 4,756,965
[45] Date of Patent: Jul. 12, 1988

[54] COMPOSITE ROD STRUCTURE

[75] Inventor: Daniel Lavely, Mt. Clemens, Mich.

[73] Assignee: Rockwell International Corporation, Pittsburgh, Pa.

[21] Appl. No.: 734,427

[22] Filed: May 16, 1985

[51] Int. Cl.⁴ .............................................. G05G 1/02
[52] U.S. Cl. ....................................... 428/596; 74/588
[58] Field of Search ................. 428/577, 596, 582, 583, 428/584, 585, 586, 587; 74/579, 588, 519; 81/900; 264/274

[56] References Cited

U.S. PATENT DOCUMENTS

| | | | |
|---|---|---|---|
| 777,411 | 12/1904 | Hall | 403/379 |
| 922,263 | 5/1909 | Cole | 403/319 |
| 1,273,712 | 7/1918 | Zeigler | 74/588 |
| 1,496,365 | 6/1924 | Bouvier | 74/588 |
| 2,159,165 | 5/1939 | Kling et al. | 74/579 R |
| 2,178,858 | 11/1939 | Hufferd | 74/579 |
| 2,195,164 | 3/1940 | Bott | 264/274 |
| 2,453,079 | 11/1948 | Rossmann | 74/579 |
| 2,470,540 | 5/1949 | Young | 74/579 |
| 2,497,319 | 2/1950 | Mott | 74/593 |
| 2,752,009 | 6/1956 | MacDougall | 74/22 |
| 2,851,903 | 9/1958 | Norris et al. | 74/579 |
| 3,016,766 | 1/1962 | Hoyler | 74/588 |
| 3,058,367 | 10/1962 | Hoffmann | 74/593 |
| 3,121,348 | 2/1964 | Reed | 74/588 |
| 3,822,609 | 7/1974 | Kotoc | 74/588 |
| 3,949,840 | 4/1976 | Cumming et al. | 188/79.5 K |
| 4,019,612 | 4/1977 | Mathews | 188/79.5 K |
| 4,256,208 | 3/1981 | Najer et al. | 188/79.5 K |
| 4,295,388 | 10/1981 | Mialon et al. | 74/579 R |
| 4,300,410 | 11/1981 | Raghupathi et al. | 74/579 R |

FOREIGN PATENT DOCUMENTS

| | | | |
|---|---|---|---|
| 455958 | 4/1913 | France | 74/579 |
| 599723 | 11/1959 | Italy | 74/579 |

*Primary Examiner*—John J. Zimmerman

[57] ABSTRACT

A composite rod structure including a slotted cylindrical-shaped jacket member and a flat rod member disposed within the slot of the jacket member for registration therewith.

8 Claims, 1 Drawing Sheet

COMPOSITE ROD STRUCTURE

BACKGROUND OF THE INVENTION

1. Field of the Invention

This invention is directed to a composite structure, more specifically to a multi-piece, multi-material composite rod structure.

2. Description of the Prior Art

Various types of rods are used to translate movement. Generally, these rods are of a one-piece construction which requires special machining of the rod end sections for connection of the rod to associated devices. Such machining requires additional time and fabrication as well as loss of material, thereby resulting in increased costs. Moreover, a one piece construction of a rod having sufficient size to impart strength against bending and torque stresses requires excess weight and material.

The present invention avoids the shortcomings and disadvantages of known rod structures by providing a two-piece composite rod structure. This composite structure includes a rod member that is generally made of steel plate of stock thickness, and may be easily formed through die punching. As a result, fabrication requires less time forming effort and waste. The structure also includes a jacket member as the second piece, wherein the jacket member is configured to slide onto the rod member or first piece for the purpose of reinforcing same. The jacket member is generally made of light, strong material, preferably of plastic and specifically of some form of crystalline thermoplastic polymer. The jacket member may be bonded directly to the rod member. Preferably, the jacket member and the rod member are mechanically locked through cooperative mounting means.

An object of the invention is to provide a composite structure comprising a first member and a second member, the latter member including an axially extending slot therethrough for receiving and registering therein the first member.

DETAILED DESCRIPTION OF THE PREFERRED EMBODIMENT

Figure 2:
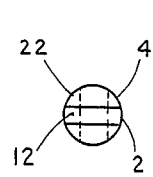
FIG. 2 is an end view of the composite rod structure of FIG. 1 when viewed from the left side thereof.
Figure 1:
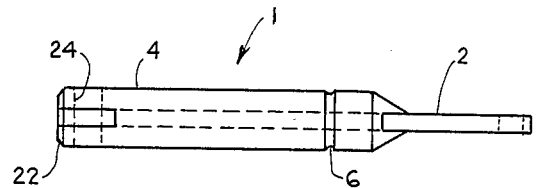
FIG. 1 is a side elevational view of a composite rod structure according to a preferred embodiment of the present invention.
Figure 3:
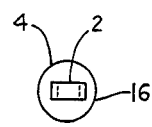
FIG. 3 is an end view of the composite rod structure of FIG. 1 when viewed from the right side thereof.
Figure 5:
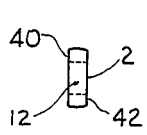
FIG. 5 is an end view of the rod member of FIG. 4 when viewed from the left side thereof.
Figure 4:
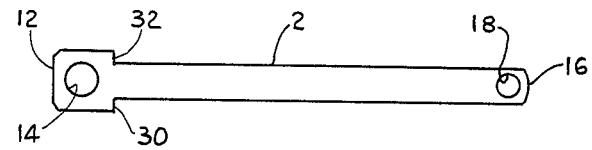
FIG. 4 is a plan view of a rod member forming one piece of the composite rod structure of FIG. 1.
Figure 6:
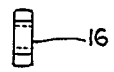
FIG. 6 is an end view of the rod member of FIG. 4 when viewed from the right side thereof.

A composite rod structure 1, according to a preferred embodiment of the invention, shall now be described with initial reference to FIGS. 1-3. As shown therein, structure 1 is composed of two components, a rod member 2 and a jacket member 4. Rod member 2 is of a substantially flat bar configuration. As more particularly shown in FIGS. 4-6, a headed end 12 of rod member 2 includes a mounting means in the form of a hole 14 through which can be inserted a pin or similar device for connection of structure 1 to another associated device. An opposite end 10 of rod member 2 includes a hole 18 which allows for the connection of structure 1 to a further associated device or member. Rod member 2 is preferably formed by punching a steel plate of stock thickness. Rod member 2 can also be treated to prevent or retard corrosion of its surfaces which are exposed to high humidity or critical environments.

Figure 7:
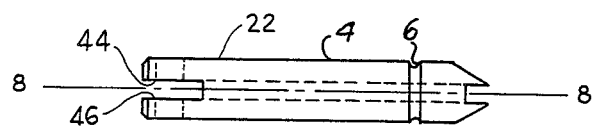
FIG. 7 is a side elevational view of a jacket member forming the other piece of the composite rod structure of the invention.
Figure 8:
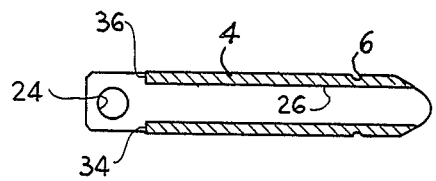
FIG. 8 is a sectional view taken along the line 8—8 of FIG. 7.

As shown in FIGS. 7 and 8, jacket member 4 is generally of a cylindrical configuration. Jacket member 4 may be formed from a variety of materials, preferably plastic materials and specifically including crystalline thermoplastic polymers offering high mechanical strength, stiffness and toughness. An end 22 of jacket member 4 includes a mounting means in the form of a hole 24 which, when structure 1 is assembled, is aligned with hole 14 of rod member 2. Jacket member 4 further includes a slot 26 which passes completely through jacket member 4 along its longitudinal axis and disposed perpendicular to the axis of hole 24. The width and thickness of slot 26 is such that rod member 2 may be slid into slot 26. To prevent rod member 2 from being able to pass completely through jacket member 4 through slot 26, headed end 12 of bar member 2 is provided with a pair of ear sections 30 and 32 that engage against complementing expanded slot sections 34 and 36 of jacket member 4. By virtue of this construction, rod member 2 is therefore prevented from passing completely through jacket member 4 when disposed in its inserted and registered position.

Jacket member 4 further includes a circumferential groove 6 for receiving a mounting ring or similar appliance carried by an associated device, such as the enlarged lip of a flexible boot seal. The foregoing describes a composite rod structure and may be embodied in other specific forms without departing from the spirit or central characteristics of the disclosed invention. Accordingly, the invention is not to be limited to the specific embodiment illustrated and described herein and the true scope and spirit of the invention are to be determined by reference to the appended claims.

I claim:

1. A composite rod structure for connecting associated devices comprising an elongate rod member having a first hole therethrough at a first end thereof for connection to a first device and a second hole therethrough at a second end thereof for connection to a second device, an elongate jacket member having a longitudinally extending cavity therethrough configured for slidably receiving the rod member therein and registration of the first end of the rod member, the jacket member including an opening therethrough and positioned such that when the first end of the rod member is registered within the cavity, the first hole is aligned with the opening.

2. The composite rod structure of claim 1 wherein the rod member is in the form of a flat bar and the cavity is in the form of a slot which extends completely through the jacket member.

3. The composite rod structure of claim 2 further including a stopping means for preventing the rod member from passing completely through the jacket member.

4. The composite rod structure of claim 3 wherein the stopping means includes at least one laterally extending ear section carried by the first end of the rod member and a complementing face formed in the jacket member for engagement by the ear section.

5. The composite rod structure of claim 4 wherein the stopping means includes a pair of laterally extending ear sections and a pair of complementing faces.

6. The composite rod structure of claim 1 wherein the rod member is formed of steel and the jacket member is formed of a crystalline thermoplastic polymer.

7. The composite rod structure of claim 1 wherein the jacket member is cylindrical in configuration and includes a conically tapered first end extending towards the second end of the rod member when the rod member is received within the cavity, and a flat second end for registration with the first end of the rod member.

8. The composite rod structure of claim 7 wherein the jacket member includes a circumferential groove disposed between the first and second ends for engagement by the enlarged lip of a flexible boot seal.

* * * * *